United States Patent
Lewis

(10) Patent No.: US 10,871,955 B2
(45) Date of Patent: Dec. 22, 2020

(54) SYSTEM AND METHOD FOR PROVIDING FIRMWARE DATA UPDATES

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 16/270,841

(22) Filed: Feb. 8, 2019

(65) Prior Publication Data

US 2019/0243634 A1    Aug. 8, 2019

Related U.S. Application Data

(60) Provisional application No. 62/628,145, filed on Feb. 8, 2018.

(51) Int. Cl.
*G06F 8/65* (2018.01)
*G06F 1/24* (2006.01)
*G06F 21/57* (2013.01)

(52) U.S. Cl.
CPC .............. *G06F 8/65* (2013.01); *G06F 1/24* (2013.01); *G06F 21/572* (2013.01); *G06F 2221/033* (2013.01)

(58) Field of Classification Search
CPC ..................................... G06F 8/65; G06F 1/24
USPC .................................................. 717/168–178
See application file for complete search history.

(56) References Cited

U.S. PATENT DOCUMENTS

| 8,321,931 | B2 * | 11/2012 | Zimmer | G06F 21/575 726/21 |
| 10,025,576 | B2 * | 7/2018 | Martinez | G06F 8/61 |
| 10,331,557 | B1 * | 6/2019 | Karpagavinayagam | G06F 12/0646 |
| 10,540,151 | B1 * | 1/2020 | Righi | G06F 8/38 |
| 2016/0179500 | A1 * | 6/2016 | Hsieh | G06F 8/71 713/2 |

OTHER PUBLICATIONS

Bashun, Vladimir, et al. "Too young to be secure: Analysis of UEFI threats and vulnerabilities."14th Conference of Open Innovation Association FRUCT. IEEE, 2013.pp. 16-24 (Year: 2013).*
Kallahalla, Mahesh, et al. "SoftUDC: A software-based data center for utility computing."Computer 37.11 (2004): pp. 38-46. (Year: 2004).*
Wang, Xueyang, et al. "Confirm: Detecting firmware modifications in embedded systems using hardware performance counters." 2015 IEEE/ACM International Conference on Computer-Aided Design (ICCAD). IEEE, 2015.pp. 544-551 (Year: 2015).*

(Continued)

*Primary Examiner* — Satish Rampuria
(74) *Attorney, Agent, or Firm* — McCarter & English, LLP; John S. Curran

(57) ABSTRACT

A system and method for updating firmware data on a computing platform in response to a firmware update request received in the form of a signed capsule file received via a runtime service is discussed. The firmware update request may be a request to update UEFI firmware and be received using the UpdateCapsule runtime service. The firmware data may include data associated with UEFI protected variables, SMBIOS data, logo data, microcode update data and pre-operating system security policy data.

17 Claims, 5 Drawing Sheets

(56) References Cited

OTHER PUBLICATIONS

Chandra, Hans, et al. "Internet of Things: Over-the-Air (OTA) firmware update in Lightweight mesh network protocol for smart urban development." 2016 22nd Asia-Pacific Conference on Communications (APCC). IEEE, 2016.pp. 115-118 (Year: 2016).*

Lee, Boohyung, and Jong-Hyouk Lee. "Blockchain-based secure firmware update for embedded devices in an Internet of Things environment." The Journal of Supercomputing 73.3 (2017): pp. 1152-1167. (Year: 2017).*

Choi, Byung-Chul, et al. "Secure firmware validation and update for consumer devices in home networking." IEEE Transactions on Consumer Electronics 62.1 (2016): pp. 39-44. (Year: 2016).*

* cited by examiner

SYSTEM AND METHOD FOR PROVIDING FIRMWARE DATA UPDATES

RELATED APPLICATION

This application claims priority to, and benefit of, U.S. Provisional Patent Application No. 62/628,145, filed Feb. 8, 2018, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

BRIEF SUMMARY

Embodiments of the present invention provide a system and method of securely updating firmware data, such as SMBIOS or protected UEFI variables or pre-operating system (i.e.: firmware) security policy, using the UEFI UpdateCapsule( ) or similar BIOS runtime service mechanism. A firmware update request is received by an operating system-based application in the form of a signed update capsule file that specifies the type of firmware data to update and the type of operations to perform on the data. These capsules may be signed using a method described in the UEFI specification for capsules and passed to the firmware using the UpdateCapsule( ) UEFI runtime service or an equivalent BIOS runtime service. The capsule signature is verified either immediately or on the next boot, and the updates are applied to the firmware data structures.

In one embodiment, a computing platform-implemented method for updating firmware data in a computing platform equipped with firmware and one or more processors includes receiving a firmware update request in the form of a signed capsule file received via a runtime service on the computing platform. The firmware update request indicates a type of firmware data to be updated and a type of update to apply to the data and the signature indicates at least one of a date or time of creation or an incremented version number. The method also includes resetting the computing platform based on the receiving of the firmware update request and verifying, with the firmware, an authenticity of the capsule signature. The method further includes verifying, with the firmware following a successful verifying of the authenticity of the capsule signature, that the computing platform matches the capsule file and then verifying, with the firmware following a successful verifying that the computing platform matches the capsule file, that the date or time of creation in the firmware update request is later than a date or time of creation of associated firmware data on the computing platform or that the version number of the update in the firmware update request is higher than an associated version number indicated on the computing platform. Additionally the method applies the firmware update request on the computing platform following a successful verification that the date or time of creation in the firmware update request is later than a date or time of creation of the associated firmware data on the computing platform or that the version number of the update in the firmware update request is higher than the associated version number indicated on the computing platform. The method further includes publishing on the computing platform, with the firmware, updated firmware data resulting from applying the update.

In another embodiment, a system for updating firmware data in a computing platform, includes a firmware update request in the form of a signed capsule file having a signature. The firmware update request indicates a type of firmware data to be updated and a type of update to apply to the data and the signature indicates at least one of a date or time of creation or an incremented version number. The system also includes an operating system (OS)-based application and a computing platform equipped with one or more processors, a firmware runtime services interface and firmware. The firmware runtime services interface is configured to receive the signed capsule file from the OS-based application. The firmware when executed causes the computing platform to reset the computing platform based on the receiving of the firmware update request and verify an authenticity of the capsule signature. The firmware when executed also causes the computing platform to verify, following a successful verifying of the authenticity of the capsule signature, that the computing platform matches the capsule file and verify, following a successful verifying that the computing platform matches the capsule file, that the date or time of creation in the firmware update request is later than a date or time of creation of associated firmware data on the computing platform or that the version number of the update in the firmware update request is higher than an associated version number indicated on the computing platform. When executed, the firmware further causes the computing platform to apply the firmware update request on the computing platform following a successful verification that the date or time of creation in the firmware update request is later than a date or time of creation of the associated firmware data on the computing platform or that the version number of the update in the firmware update request is higher than the associated version number indicated on the computing platform. Additionally execution of the firmware causes the computing platform to publish on the computing platform updated firmware data resulting from applying the update.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
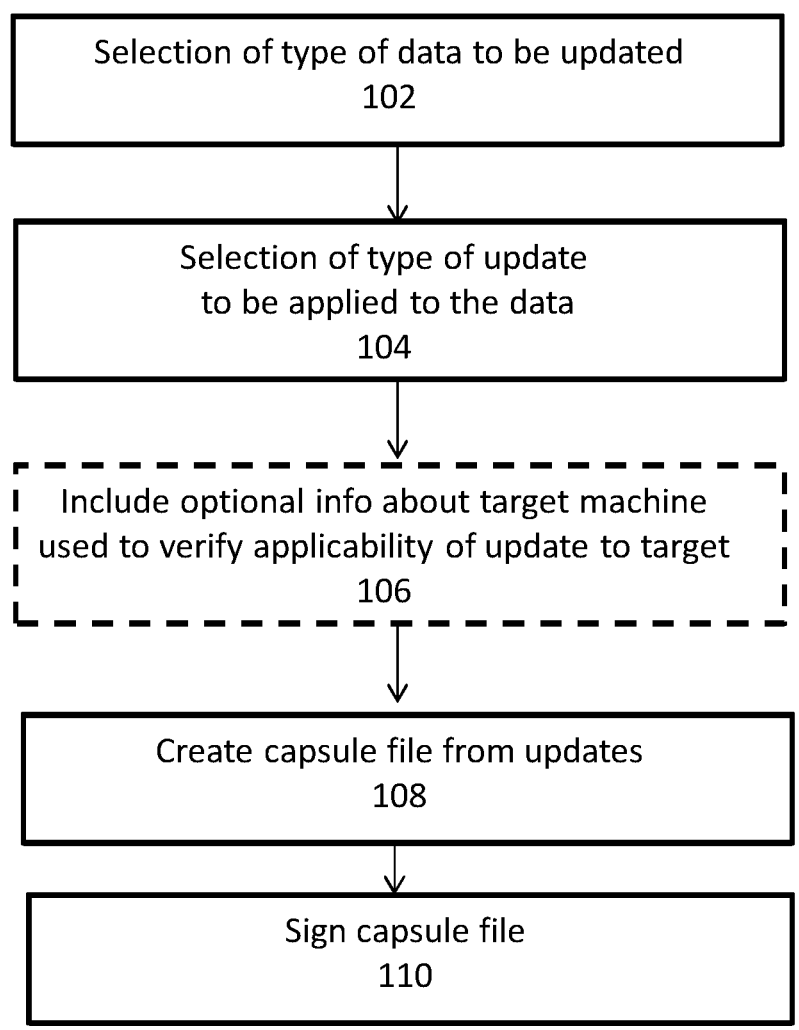
FIG. 1 depicts an exemplary sequence of steps in a computing system to create a firmware update capsule in an exemplary embodiment.

The BIOS in a computing platform contains configuration settings that control its behavior. These configuration settings are typically stored in UEFI variables. The BIOS also acts as a repository of platform information that is published to the operating system. As a repository, the BIOS contains a mixture of static data, set when the platform is manufactured or provisioned, and dynamic data, created when the platform is booting. For example, the System Management BIOS (SMBIOS) tables contain information about the manufacturer (static) and temperature (dynamic). Sometimes configuration settings and repository data must be updated after the platform has left the manufacturing environment. It is most convenient if this can be done by an OS application. However, this is a sensitive operation, since these settings may control critical platform functionality and the repository data may contain platform asset control and identification information. Accordingly, it is important that this sort of update can only be performed by agents who are authorized to do so, such as, but not limited to, the platform vendor, the systems integrator or the platform administrator.

Previous attempts to provide firmware updates have led to mechanisms where the entire BIOS must be replaced, or else the entire variable region. This is sub-optimal, since care must be taken to avoid overwriting other un-related configuration settings. For example: the typical BIOS is shipped with UEFI secure boot turned off and with the default set of security certificates. Accordingly, flashing the BIOS conventionally turns off the UEFI secure boot and removes the installed extra certificates (e.g. those certificates that have been installed post-shipping), which would be an undesirable result. Most BIOS's require a list of "protected" variables that are preserved, but this is difficult to maintain and doesn't handle the case when the user needs to update the protected variables. Additional partial approaches to the firmware update problem have been attempted by providing a private interface for handling SMBIOS updates during manufacturing but these techniques have a security model that is limited and cannot verify the authenticity of the updates post manufacturing. Other private variable interfaces that bypass the normal security model present additional security concerns. Additional conventional approaches to updating firmware data on a computing platform have used a custom software SMI interface, a reserved region in the flash device or a special UEFI variable. These custom approaches are all sub-optimal for various reasons and, since they are custom approaches, vary based upon the platform.

To address these issues, a three stage mechanism is used to create and process firmware data update requests by embodiments of the present invention. The first stage creates a firmware update request capsule file that provides details of a request to update firmware data on a computing platform. A second stage deploys the update request to a target computing platform while a third stage applies the update following verification of the request. The use of capsule files by embodiments provides extra flexibility for delivering updates to firmware data. Capsules can be signed (like UEFI variables) and therefore have inherent tamper resistance. The use of capsules to update firmware data does not require runtime updates to the flash device thereby allowing the flash device to remain locked down during runtime. There are also a variety of delivery options for capsule files including flash, and disk (and RAM if an S3-capsule style is used). In addition, capsules offer an interface (like UEFI variables) that is available under most operating systems and fits within current OS-present plans for delivery of firmware updates. Operating systems like Windows™ and Linux™ can poll a server for updates and, since the updates are in capsule format, the OS or other application program can detect whether the firmware supports that capsule type (through the firmware's published EFI System Resource Table (ESRT) and the QueryCapsuleCapabilities runtime service) and deliver the capsule using the UpdateCapsule( ) runtime service. As a result the OS or OS-based application doesn't need to know the particular type of update to firmware data being performed. Embodiments thus adapt a firmware update model conventionally used in the industry for delivering code and image updates in order to enable the update of specific tables of firmware data on a computing platform. In many cases, these tables, such as, but not limited to SMBIOS data, UEFI variables, microcode or audio codec verb tables are stored in a fashion that is not standard between different firmware implementations and require support from the specific platform firmware. The use of capsule files by embodiments as described herein to deliver firmware data update requests enables a consistent approach to be used regardless of the firmware implementation being deployed on a target computing platform.

In one embodiment, the first stage of the update mechanism is the creation of the update capsule. The requestor, such as, but not limited to, a platform vendor, system integrator or platform administrator, selects the type of data to be updated and the type of update to be applied to the data. Optionally information about the target machine, including model number or unique platform identifier or firmware version number, may be added to the update and this additional information can be used to verify the applicability of the update. Once the update data has been identified, and the type of update selected, the capsule file is created from the updates. In one embodiment, a "capsule" file is a contiguous set of data that starts with an EFI_CAPSULE_HEADER such as described in version Section 8.5.3 of Version 2.7 of the UEFI Specification. The CapsuleGuid field in the header defines the format of the capsule (see Section 8.5.3.1, UEFI Specification, Version 2.7). The contents of UEFI Specification, Version 2.7 (May 2017) are incorporated herein by reference in their entirety. It will be appreciated that other capsule file formats not specifically adhering to the UEFI specification but consistent with the principles described herein should also be considered to be within the scope of the present invention.

In one embodiment, after the update capsule has been created it is signed and a resulting X.509 signature or its equivalent is inserted. This includes the data/time of creation, and/or incremented version number in order to protect against roll-back attacks. In another embodiment, to sign the capsule file, the user logs into a secure web site and uploads the unsigned capsule file. The secure web site will then sign the capsule file with a private key and then permit the download of the updated file.

FIG. 1 depicts an exemplary sequence of steps in a computing system to create a firmware update capsule in an exemplary embodiment. The sequence begins with the selection of the type of firmware data to be updated by the update requestor (step 102). As a non-limiting example, the firmware data specified may be, but is not limited to, data for UEFI protected variables, SMBIOS data, logo data, microcode update data and pre-operating system security policy data. The type of update to be performed is also specified (step 104). Exemplary types of updates are discussed further below, but include without limitation, addition, deletion, and/or replacement operations for SMBIOS data. Exemplary operations also include setting, deletion, appending, prepending and/or updating operations for firmware volumes. Exemplary operations additionally include setting, deletion and/or updating of position operations for logo data and setting and/or deleting operations associated with microcode update operations. For pre-operating system operations exemplary operations include deleting, updating and replacing user operations, deleting, updating and replacing policy operations, disabling and enabling device operations and user login operations. In one embodiment, the capsule file may also include information about target machine, including but not limited to, model number or unique platform identifier or firmware version number that can be used by firmware executing on the target computing platform to verify the applicability of the update to the computing platform (step 106). The indicated information is used to create the capsule file (step 108) which is then signed (step 110). In one embodiment the signing creates an X.509 signature that is inserted into the capsule. In another embodiment, to sign the capsule file, the capsule creator may utilize a secure website and private key as outlined above.

In the second stage of the exemplary firmware update mechanism, the firmware update request in the form of the signed capsule is deployed to a target computing platform Embodiments of the present invention make use of an OS-based application, OS driver or other OS process executing in an operating system environment controlled by the operating system as well as a firmware runtime service. For ease of description herein the OS-based application, OS driver and OS process may be collectively referred to herein as an OS-based application except where otherwise evident from the context. In one embodiment, the OS-based application discussed herein may be integrated into the operating system as an OS process. In an embodiment, the OS-based application may run as a part of a normal OS update program, such as Windows® Update, where updates are staged by an OS-based application from a trusted server.

In one embodiment, an OS-based application reads the capsule file into memory and calls the UEFI UpdateCapsule( ) runtime service. For most firmware updates, this runtime service will indicate that a reset is necessary after examining the update capsule file's header (see EFI_CAPSULE_HEADER's Flags field and CAPSULE_FLAGS_INITIATE_RESET) and calling the UEFI runtime service QueryCapsuleCapabilities (see ResetType). The capsule may also contain an application that will be invoked as a part of the capsule processing (see UEFI FMP capsules) or the OS application can position another UEFI application to be called by the firmware as a part of the next OS boot process by adding a SysPrep#### or PlatformRecovery#### UEFI variable (see chapter 3 of the UEFI spec) that specifies the location of the UEFI application to be used prior to booting. Following execution of the operations specified in the update capsule, the application or driver may also look for firmware-published data tables like an ESRT to determine the results of the update process and report it to the user. An ESRT is a table that provides a mechanism for identifying integrated device and system firmware resources. Each entry in the ESRT describes a device or system firmware resource that can be targeted by a firmware update driver package. Each firmware resource that can be updated by a firmware update driver package must be described by exactly one entry in the ESRT to enable firmware updates to be deployed and installed.

Figure 2:
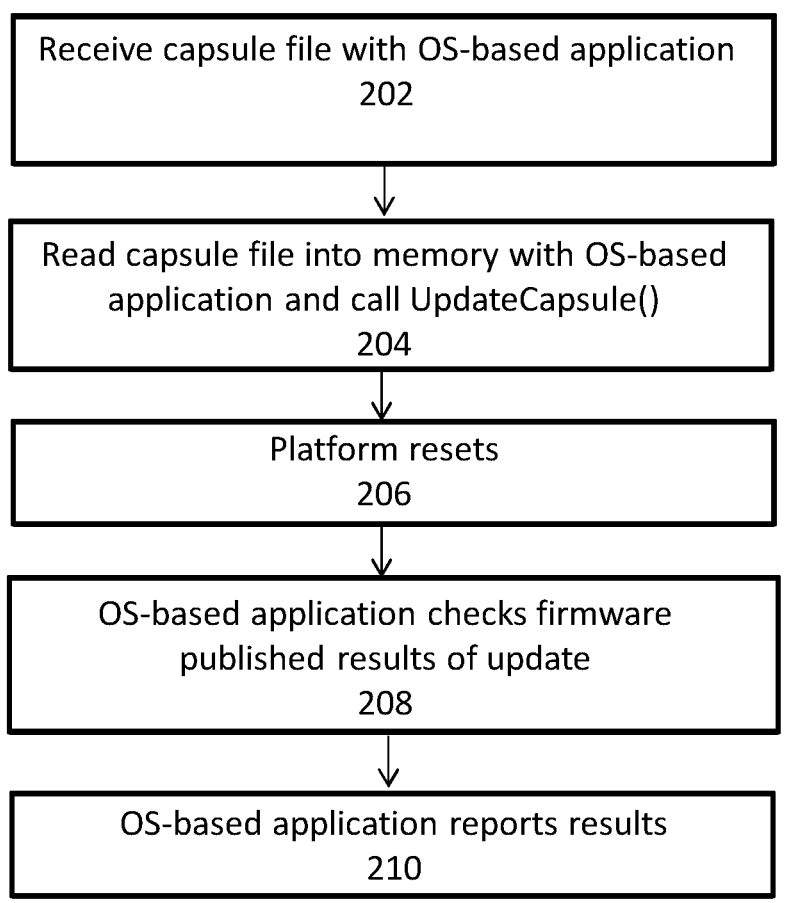
FIG. 2 depicts an exemplary sequence of steps performed by an OS-based application to deploying a firmware update capsule and report the results of the update in an exemplary embodiment.

FIG. 2 depicts an exemplary sequence of steps performed by an OS-based application to deploy a firmware update capsule and report the results of the update in an exemplary embodiment. The sequence begins with the OS-based application (e.g. an OS-based application, OS driver or other OS-based process) receiving the capsule file containing the firmware update request (step 202). The capsule file is read into memory and UpdateCapsule( ) is called (step 204). After the computing platform resets and the update is executed as part of the next boot sequence (step 206) the OS-based application checks the firmware-published results of the update (step 208), such as by checking an ESRT table, and reports the results of the update to a user of the computing platform (step 210). For example, the results may be reported via a displayed message or by recording them in a log file accessible to the user.

Figure 3:
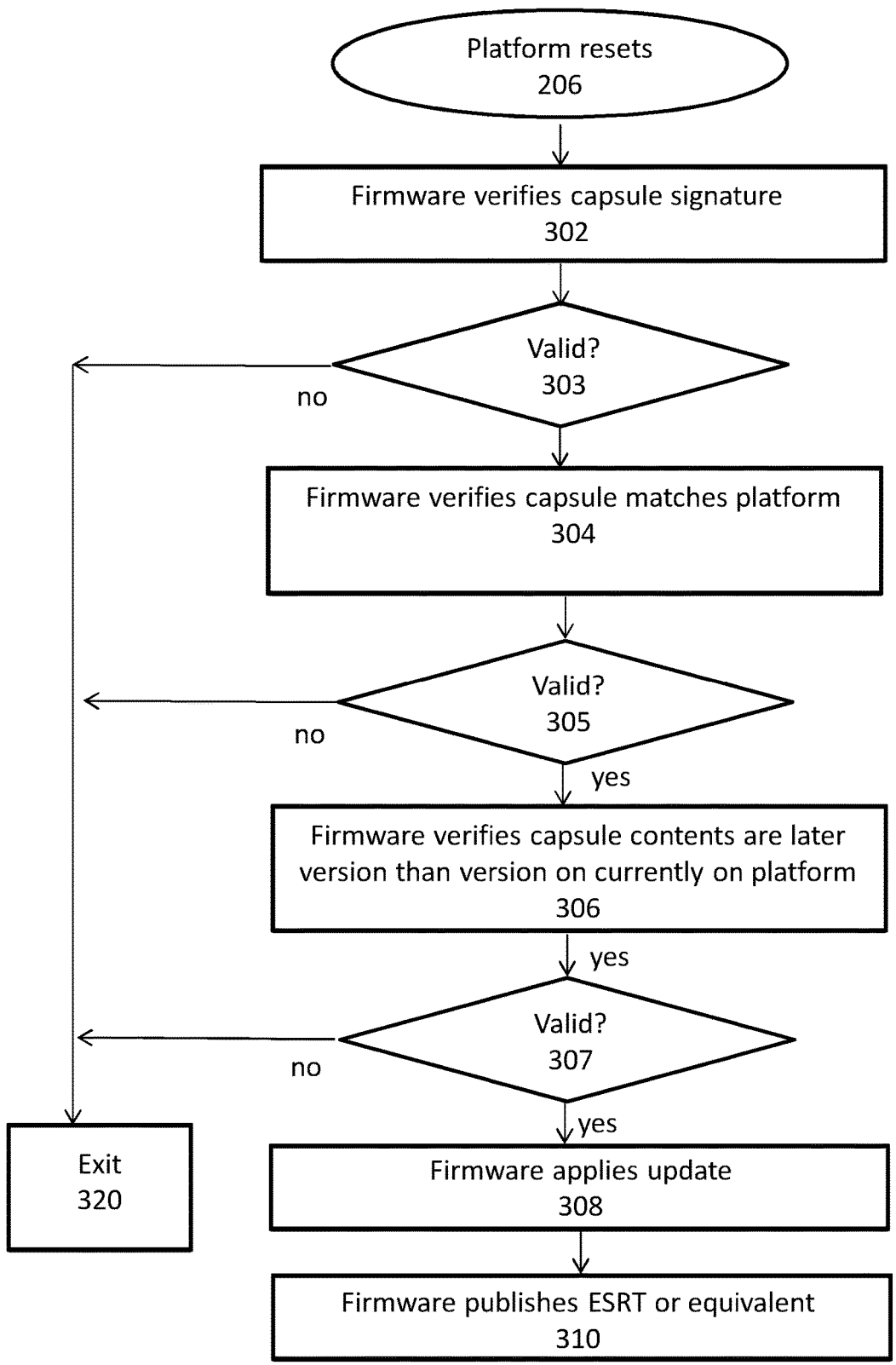
FIG. 3 depicts an exemplary sequence of steps performed by firmware in a computing system to update firmware using an update capsule in an exemplary embodiment.

After the deployment of the update capsule file to the target computing platform, the firmware running on the target computing platform is responsible for executing the requested update after reset. The firmware performs a number of tasks for the computing platform to apply the update. FIG. 3 depicts an exemplary sequence of steps performed by firmware in a target computing system to update firmware using an update capsule in an exemplary embodiment. In one embodiment, following the reset (step 206) the firmware performs a verification process of the capsule signature (step 302). For example, the signature may be verified using the public key or keys in the database of keys approved for capsule validation. If the signature is not verified, the failure is reported and the sequence exits (step 320). In an alternative embodiment, the signature is verified before the reset and the reset is only performed in the event of a successful verification. If the signature is verified (step 303) then the firmware attempts verification of the capsule contents to ensure that they match the current platform (step 304). The verification of the match of the capsule to the target platform may be performed by the firmware in a number of ways. In one embodiment, the firmware may verify that the firmware data type and type of requested update specified in the capsule match the target platform by checking firmware data that exists on the platform and operations supported by the platform. In another embodiment, the match may be determined by examining whether a platform GUID in the capsule matches a GUID found in the SMBIOS Type 1 record UUID field, whether the version in the capsule is greater than the version found in a firmware table like Insyde Software's BVDT table, and/or whether the model of the platform matches the capsule-specific model information. These kind of matches are determined using UpdateCapsule( ) and cause an error to be returned if the capsule is not meant for the target platform. In one embodiment, the match may be determined based upon the "format" of the data (e.g.: SMBIOS update record version 1 vs. SMBIOS update record version 2). In another embodiment, the verification of the match may be determined by the firmware checking whether the update may be processed while battery power is low or A/C power is connected. If this match verification fails (step 305), then this failure is reported in the ESRT or equivalent status reporting mechanism and the sequence exits (step 320). If this match verification succeeds (step 305), then the firmware attempts to verify that the capsule contents are of a later version than the version of the firmware data currently on the target platform (step 306). If the verification fails (step 307) because the capsule contents are not a later version, then the firmware reports this in the ESRT or equivalent status reporting mechanism and exits (step 320). If the version verification succeeds (step 307) then the firmware applies the requested update (step 308) and publishes the results of the update to the ESRT or its equivalent (step 310).

Figure 4:
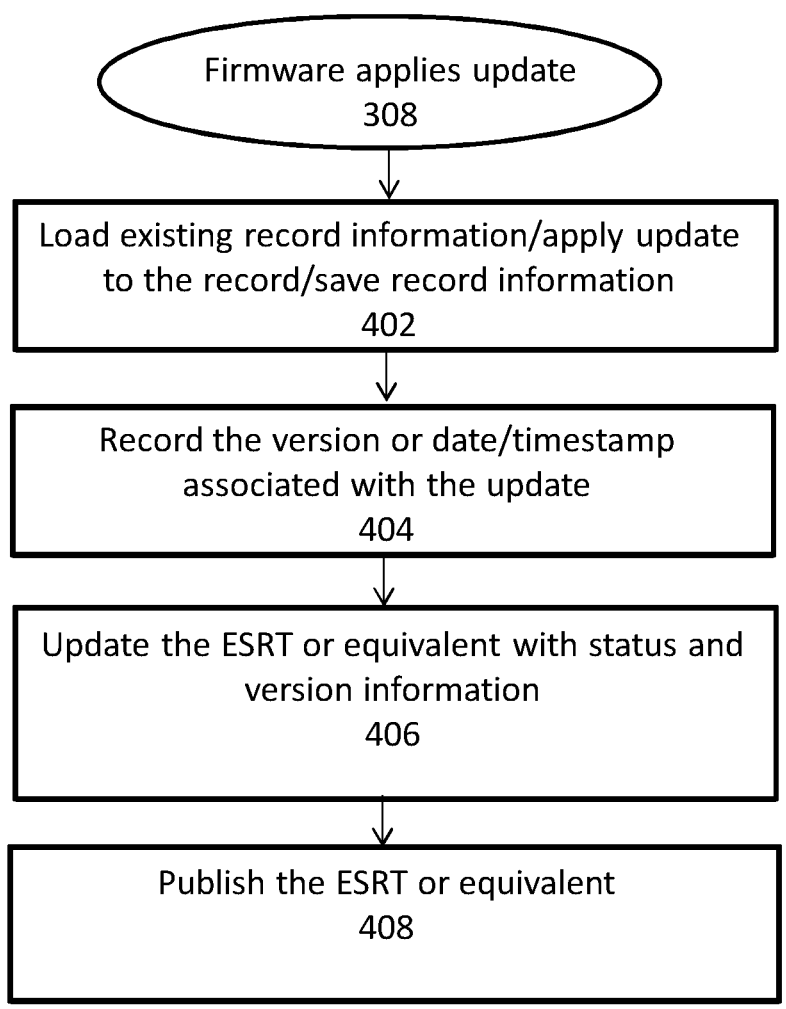
FIG. 4 depicts an exemplary sequence of steps performed by firmware to process the update capsule of FIG. 3 in greater detail in an exemplary embodiment.

The application of the firmware data update is discussed greater detail in FIG. 4. FIG. 4 depicts an exemplary sequence of steps performed by firmware on the target computing platform to process the update capsule of FIG. 3 in greater detail in an exemplary embodiment. For each requested firmware update, the firmware on the target computing platform examines each record associated with the update and loads any existing record information, applies the update to the record and saves the record information (step 402). The firmware further records the version or date/time stamp associated with the update (step 404) and updates the ESRT with status and version information (step 406). The firmware then publishes the results of the update to the ESRT or its equivalent (step 408).

Embodiments may utilize the Firmware Update Capsule, described in chapter 23 of the UEFI specification (2.7), where each type of update may be described using a separate GUID in the UpdateImageTypeId field in the EFI_FIRMWARE_MANAGEMENT_CAPSULE_IMAGE_HEADER. This allows it to match an instance of the Firmware Management protocol. In another embodiment, update types may be combined as one, with the different types as a part of a single image.

As noted above, embodiments may update a number of forms of firmware data and may perform a number of different types of update operations. For illustrative purposes, a number of these operations and types of data are described below. It should be appreciated however that the examples are not exhaustive and the present invention is not so limited.

SMBIOS Updates

For SMBIOS updates, the record information that was saved above is processed during SMBIOS record creation. SMBIOS records are specified by the handle number, or by the SMBIOS record type and an instance number. Exemplary types of updates supported are:

Add—Adds a new SMBIOS record. If the record handle 0xfffe is specified, then a new, unique handle is supplied. See EFI_SMBIOS_PROTOCOL.Add( ) in the PI Specification. An error is generated if the handle is already in use.

UpdateString—Replaces the specified string in the specified SMBIOS record. See EFI_SMBIOS_PROTOCOL.UpdateString( )

UpdateData—Specifies a portion of the fixed portion of the SMBIOS record, along with a mask that indicates which bytes should be updated. Equivalent to finding the record in the SMBIOS table (published in the EFI System Configuration table), getting the data, removing the record (Remove( )) and then adding it again with the modified data.

Delete—Deletes the specified record.

Replace—Replaces the specified record with this record. Equivalent to a Delete followed by an Add.

UEFI Variable Updates

UEFI variables are specified by a GUID and a null-terminated Unicode string. The default identifier specifies whether the current UEFI variable contents are updated or one of the sets of defaults for a specific board or for a specific use.

Exemplary types of updates supported by embodiments are:

Set—Creates or replaces a UEFI variable with the specified GUID and name, the specified attributes and the specified data. This can include authentication data. Any existing variable attributes are replaced with the specified ones.

Delete—Deletes an existing UEFI variable with the specified GUID and name. Can specify authentication data.

Append—Appends the specified data to the specified UEFI variable. If the variable does not exist, it is created with the data. Can specify authentication data.

Prepend—Prepends the specified data to the specified UEFI variable. If the variable does not exist, it is created with the data. Can specify authentication data.

UpdateData—Specifies a portion of the fixed portion of the UEFI variable data, along with a mask that indicates which bytes should be updated.

Logo Data

For logos, supported operations include:

Set—Specifies the logo type and logo data for the specified logo type and the specified logo instance.

Delete—Specifies the data for the specified logo type and specified logo instance.

UpdatePosn—Modifies the position or priority for the specified logo type and specified logo instance.

Microcode Update

For microcode data, supported operations include:

Set—Specifies the data for the specified CPU ID and revision.

Delete—Deletes the data for the specified CPU ID and revision.

Pre-OS Security Policy

UEFI specification, chapter 35.4, describes types of common security policies that are associated with a specific user and may be updated by embodiments. These include allowing or prohibiting loading specific executables to or from specific devices, allowing enrolling new users, adding enrollment data (such as password, fingerprint, etc.), whether setup is accessible, allowing or forbidding specific devices to be connected (started in the driver model), changing the boot order, policy information about which credential providers can be used and in what combination, smart card information, user name and/or number of retries for a password. In exemplary embodiments, for security policies, supported operations include:

SetPolicy: Specifies the content of a specific policy for a specific user.

Additional operations include; DeleteUser, DeletePolicy, UpdateUser, UpdatePolicy, ReplacePolicy, ReplaceUser, DisableDevice and EnableDevice. Supported operations also include Login to login as a specified user.

Figure 5:
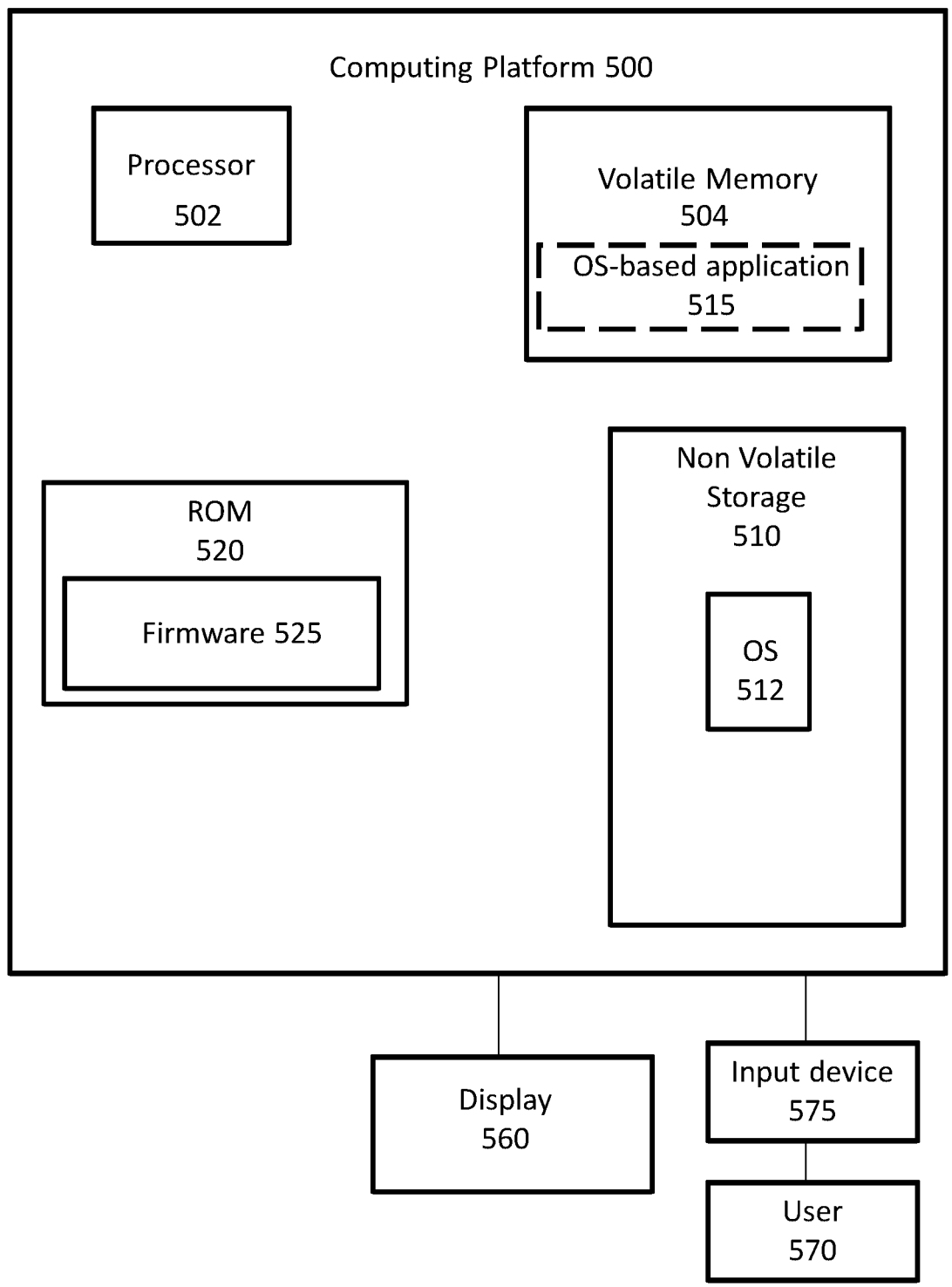
FIG. 5 depicts an exemplary computing platform suitable for practicing an exemplary embodiment.

FIG. 5 depicts an exemplary computing platform suitable for practicing an exemplary embodiment. A computing platform 500 includes a processor 502 such as, but not limited to a central processing unit (CPU), and volatile memory such as random access memory (RAM) 504. The computing platform 500 may also include non-volatile storage 510 such as a hard drive holding an operating system (OS) 512. The computing platform 500 also includes Read Only Memory (ROM) 520 holding platform firmware 525. ROM 520 may be flash memory and may be provided in the form of one or more NVDIMMs (not shown) that may each include Flash memory, DRAM and a memory controller. Firmware 525 may be executed during a boot sequence for the computing platform 500 as well as at other times. For example, firmware 525 may load OS 512 into volatile memory 504 for execution during the boot sequence and may update firmware data on the computing platform following a platform reset as described herein in response to a request from the UpdateCapsule runtime service. An OS-based application 515 loaded into RAM 504 may be executed to receive a capsule file as described herein and may call a firmware runtime service to initiate the requested update. A user 570 may utilize an input device 575 such as a keyboard or touch screen to interact with computing platform 500. Display 560 may be integrated into computing platform 500 or may be a separate display surface.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing platform-implemented method for updating firmware data in a computing platform equipped with firmware and one or more processors, comprising:

receiving a firmware update request in the form of a signed capsule file received via a runtime service on the computing platform, the firmware update request indicating a type of firmware data to be updated and a type of update to apply to the data, the signature indicating at least one of a date or time of creation or an incremented version number;

resetting the computing platform based on the receiving of the firmware update request;

verifying, with the firmware, an authenticity of the capsule signature;

verifying, with the firmware following a successful verifying of the authenticity of the capsule signature, that the computing platform matches the capsule file, verifying, with the firmware following a successful verifying that the computing platform matches the capsule file, that the date or time of creation in the firmware update request is later than a date or time of creation of associated firmware data on the computing platform or that the version number of the update in the firmware update request is higher than an associated version number indicated on the computing platform;

applying the firmware update request on the computing platform following a successful verification that the date or time of creation in the firmware update request is later than a date or time of creation of the associated firmware data on the computing platform or that the version number of the update in the firmware update request is higher than the associated version number indicated on the computing platform; and publishing via an Extensible Firmware Interface (EFI) System Resource Table (ESRT) on the computing platform, with the firmware, a result of applying the update.

2. The method of claim 1, wherein the firmware applying the firmware update request further includes for each firmware data type update:

applying the request to each record associated with the update type by loading the existing record information, applying the update to the record, and saving the record information, recording the at least one of the date or time of creation or the incremented version number indicated in the firmware update request, and updating published information for the firmware to include update status information and the date or time of creation or the incremented version number from the firmware update request.

3. The method of claim 1 wherein the type of firmware data indicated in the firmware update request is associated with a protected Unified Extensible Firmware Interface (UEFI) variable.

4. The method of claim 1 wherein the type of firmware data in the firmware update request is System Management BIOS (SMBIOS) data.

5. The method of claim 1 wherein the type of firmware data in the firmware update request is one of logo data, data for a microcode update and data for a pre-operating system security policy.

6. The method of claim 1 wherein the firmware update request is a Unified Extensible Firmware Interface (UEFI) firmware update request received via a UEFI UpdateCapsule runtime service.

7. A non-transitory medium holding computing-platform executable instructions for updating firmware data in a computing platform equipped with firmware and one or more processors, wherein the instructions when executed cause the computing platform to:

receive a firmware update request in the form of a signed capsule file received via a runtime service on the computing platform, the firmware update request indicating a type of firmware data to be updated and a type of update to apply to the data, the signature indicating at least one of a date or time of creation or an incremented version number;

reset the computing platform based on the receiving of the firmware update request;

verify, with the firmware an authenticity of the capsule signature;

verify, with the firmware following a successful verifying of the authenticity of the capsule signature, that the computing platform matches the capsule file, verify, with the firmware following a successful verifying that the computing platform matches the capsule file, that the date or time of creation in the firmware update request is later than a date or time of creation of associated firmware data on the computing platform or that the version number of the update in the firmware update request is higher than an associated version number indicated on the computing platform;

apply the firmware update request on the computing platform following a successful verification that the date or time of creation in the firmware update request is later than a date or time of creation of the associated firmware data on the computing platform or that the version number of the update in the firmware update request is higher than the associated version number indicated on the computing platform; and publishing via an Extensible Firmware Interface (EFI) System Resource Table (ESRT) on the computing platform, with the firmware, a result of applying the update.

8. The medium of claim 7, wherein the firmware applying the firmware update request further includes for each firmware data type update:

applying the request to each record associated with the update type by loading the existing record information, applying the update to the record, and saving the record information, recording the at least one of the date or time of creation or the incremented version number indicated in the firmware update request, and updating published information for the firmware to include update status information and the date or time of creation or the incremented version number from the firmware update request.

9. The medium of claim 7 wherein the type of firmware data indicated in the firmware update request is associated with a protected Unified Extensible Firmware Interface (UEFI) variable.

10. The medium of claim 7 wherein the type of firmware data in the firmware update request is System Management BIOS (SMBIOS) data.

11. The medium of claim 7 wherein the type of firmware data in the firmware update request is one of logo data, data for a microcode update and data for a pre-operating system security policy.

12. The medium of claim 7 wherein the firmware update request is a Unified Extensible Firmware Interface (UEFI) firmware update request received via a UEFI UpdateCapsule runtime service.

13. A system for updating firmware data in a computing platform, comprising:

a firmware update request in the form of a signed capsule file having a signature, the firmware update request indicating a type of firmware data to be updated and a type of update to apply to the data, the signature indicating at least one of a date or time of creation or an incremented version number;

an operating system (OS)-based application;

a computing platform equipped with one or more processors, a firmware runtime services interface and firmware, wherein the firmware runtime services interface is configured to receive the signed capsule file from the OS-based application and the firmware when executed causes the computing platform to:

reset the computing platform based on the receiving of the firmware update request;

verify an authenticity of the capsule signature;

verify, following a successful verifying of the authenticity of the capsule signature, that the computing platform matches the capsule file, verify, following a successful verifying that the computing platform matches the capsule file, that the date or time of creation in the firmware update request is later than a date or time of creation of associated firmware data on the computing platform or that the version number of the update in the firmware update request is higher than an associated version number indicated on the computing platform;

apply the firmware update request on the computing platform following a successful verification that the date or time of creation in the firmware update request is later than a date or time of creation of the associated firmware data on the computing platform or that the version number of the update in the firmware update request is higher than the associated version number indicated on the computing platform; and publish via an Extensible Firmware Interface (EFI) System Resource Table (ESRT) on the computing platform a result of applying the update.

14. The system of claim 13 wherein the type of firmware data indicated in the firmware update request is associated with a protected Unified Extensible Firmware Interface (UEFI) variable.

15. The system of claim 13 wherein the type of firmware data in the firmware update request is System Management BIOS (SMBIOS) data.

16. The system of claim 13 wherein the type of firmware data in the firmware update request is one of logo data, data for a microcode update and data for a pre-operating system security policy.

17. The system of claim 13 wherein the firmware update request is a Unified Extensible Firmware Interface (UEFI) firmware update request received via a UEFI UpdateCapsule runtime service.

* * * * *